United States Patent [19]

Bullinga

[11] 4,019,096
[45] Apr. 19, 1977

[54] CURRENT LIMITING APPARATUS
[75] Inventor: Johannes Bullinga, Cedar Rapids, Iowa
[73] Assignee: Rockwell International Corporation, El Segundo, Calif.
[22] Filed: June 7, 1976
[21] Appl. No.: 693,452
[52] U.S. Cl. .................................. 361/86; 323/9; 361/75
[51] Int. Cl.² .................................. H02H 3/08
[58] Field of Search ............ 317/22, 36 TD; 323/9

[56] References Cited
UNITED STATES PATENTS

| | | | |
|---|---|---|---|
| 3,302,062 | 1/1967 | Craig | 317/22 |
| 3,697,813 | 10/1972 | Fox | 317/36 TD |
| 3,725,739 | 4/1973 | Griffey | 317/36 TD |
| 3,899,718 | 8/1975 | Schafe | 323/9 X |

Primary Examiner—A. D. Pellinen
Attorney, Agent, or Firm—Bruce C. Lutz; Robert J. Crawford

[57] ABSTRACT

A series current limiting circuit for intermittent current flow when the current exceeds a predetermined limit. A time delay circuit is incorporated to maintain the interrupted condition for a predetermined additional time after initial interruption before returning the circuit to an ON state whereby it can be determined if the conditions causing overload have been removed.

4 Claims, 1 Drawing Figure

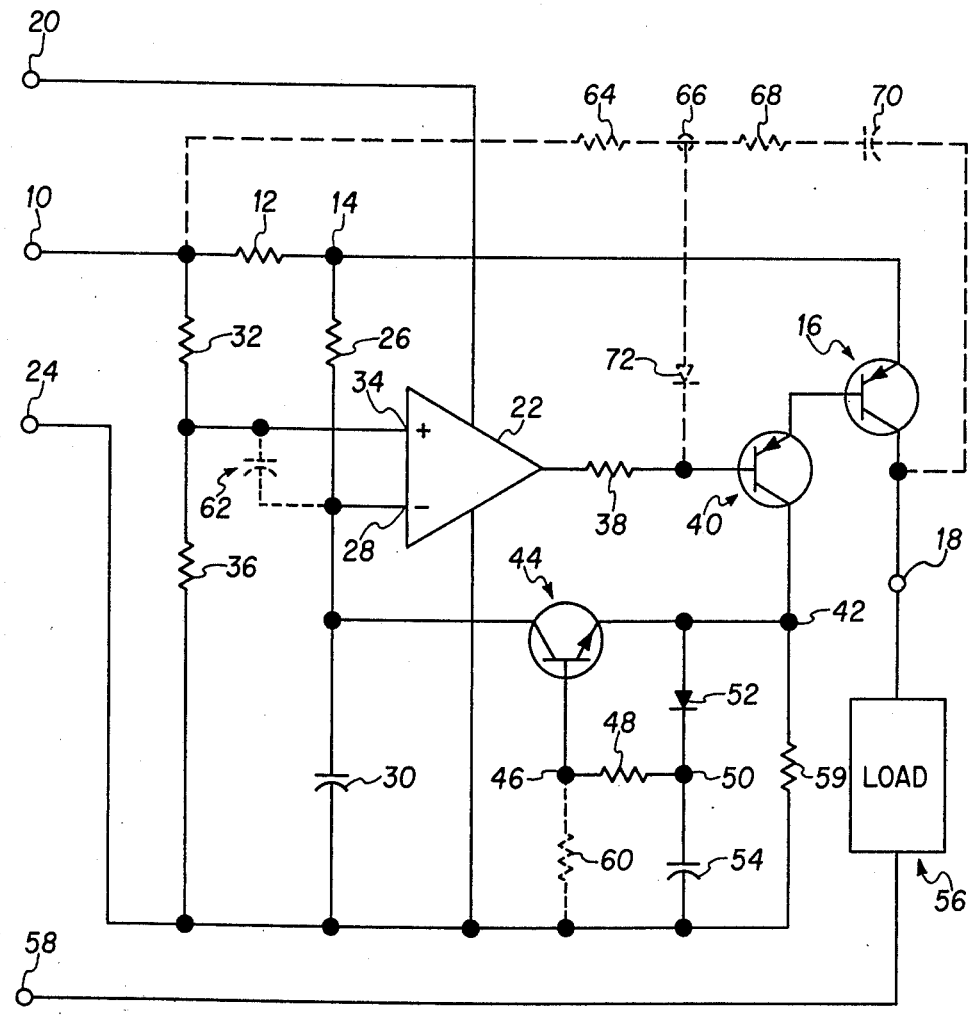

CURRENT LIMITING APPARATUS

THE INVENTION

The present invention is generally related to electronics and more specifically related to a current limiting circuit.

Simple high current regulators, as distinguished from current limiters, dissipate a considerable amount of power in the sensing resistor and series pass transistor under full load conditions. When the output voltage of these regulators is 30 volts or higher and the output is shorted, this dissipation can easily increase by a factor of 10. Hence, with simple current regulators, the heat sink must be designed to handle much more power than the worst case full load dissipation if the circuit is to survive short circuit conditions. This increases the bulk of the regulator substantially.

An improvement to the simple current regulator comprises a technique called fold-back current limiting wherein power dissipation in the current passing transistor reaches a maximum at some point between full load and short-circuited output. The maximum power dissipation in this circuit is about one-half the input voltage times the full-load current. However, even in this improved circuit, power dissipation can still be intolerable in some cases where the power source is limited in capability such as airborne equipment. Further, fold-back current limiting or regulating can only be implemented in combination with a voltage regulator. Thus, where high efficiency of the circuit is also required, fold-back current limiting is not considered to be satisfactory.

The present inventive concept combines efficiency with small physical size and low weight to overcome the disadvantages of the prior art. The present invention is strictly a current limiter wherein the current pass transistors stay in a full ON condition until the preset current limit is reached at which point they are turned full OFF. These transistors remain in an OFF condition for a period determined by a first time delay circuit. After the expiration of the time delay, the transistors are again allowed to pass current to the load. If the overload condition is still present, the circuit will pass current for only a given minimal time, as determined by a second time delay circuit, before again turning OFF for the predetermined time period. The high efficiency at full load is achieved by implementing a differential amplifier with a low offset voltage. The low offset voltage permits the use of a low value current sensing resistor thereby resulting in improved load regulation and low power dissipation in the sense resistor. When the circuitry trips into the overload mode, then and only then, the circuit switches into a duty cycle mode with a duty cycle of less than one percent. Thus, there is very low power dissipation in the current limit mode. Under normal full-load conditions, this current limiter dissipates one-fifth of the power that is dissipated in the conventional current limiter. Under short-circuit conditions, this current limiter dissipates only about one-fiftieth of the power that is dissipated in the conventional one. As compared to a fold-back current limiting arrangement, the dissipation under normal load is approximately one-seventh whereas the dissipation under short circuit conditions is approximately 1/22.

It is, therefore, an object of the present invention to provide an improved current limiting circuit.

Other objects and advantages of the present invention may be ascertained from a reading of the specification and attached claims in conjunction with the drawing which shows a detailed circuit diagram of a preferred embodiment of the inventive concept.

DETAILED DESCRIPTION

In the FIGURE, an input terminal 10 is connected to one end of a sensing resistor or current trip resistor 12 which has its other end connected to a junction point 14. A PNP transistor generally designated as 16 has an emitter connected to a junction point 14 and a collector connected to an output terminal or junction point 18. A positive power terminal 20 is connected to supply power to a comparator amplifier 22 with a negative terminal 24 supplying power from a negative source to this same comparator 22. Although many models of comparators may be utilized to practice the invention, one unit actually used was designated as LM 711 as marketed by National Semiconductor. The prime requirement is that the amplifier change output polarities suddenly upon detection of a relative change in polarity between the two inputs.

A resistor 26 is connected between junction point 14 and an inverting or negative input 28 of amplifier 22. A capacitor 30 is connected between input 28 and power terminal 24. A resistor 32 is connected between input 10 and a positive or non-inverting input 34 of amplifier 22. A further resistor 36 is connected between input 34 of amplifier 22 and the power terminal 24. A resistor 38 is connected between an output of comparator 22 and a base of a PNP transistor designated as 40. An emitter of transistor 40 is connected to a base of transistor 16 and a collector of transistor 40 is connected to a junction point 42. A NPN transistor generally designated as 44 has a collector connected to input 28 of comparator 22 while its emitter is connected to junction point 42 and the base is connected to a junction point 46. A resistor 48 is connected between junction point 46 and a junction point 50. A diode 52 is connected between junction point 42 and junction point 50 with the direction of easy current flow towards junction point 50. A capacitor 54 is connected between junction point 50 and power input terminal 24. A load generally designated as 56 is connected between junction point 18 and a further terminal 58 which would be connected to ground potential of the power source supplying current through lead 10. A resistor 59 is connected between junction point 42 and terminal 24.

A dash line resistor 60 is illustrated connected between junction point 46 and terminal 24. A capacitor 62 is shown in dash line configuration across the input terminals of comparator 22. A dash line resistor 64 is shown connected between a junction point 66 and input 10. A dash line resistor 68 is shown connected in series with a dash line capacitor 70 between junction point 66 and output terminal 18. A dash line diode 72 is shown connected between junction point 66 and the base of transistor 40. The dash line components are additional optical equipment which may be used for specific applications of the preferred embodiment of the circuit.

OPERATION

In one embodiment of the inventive concept, the terminals 20 and 24 were plus and minus 5 volts, respectively, as compared to the potential of that appearing on input terminal 10. This power is used, when the load is not connected or when the current is less than the design amount, to bias the voltage at input 28 of comparator 22 to be higher than that appearing at input 34. This produces a low voltage at the output of comparator 22 to turn on transistor 40 and accordingly transistor 16. With these two transistors turned in a fully ON condition, there is a closed circuit between input terminal 10 and output terminal 18. When a load is connected, current is passed through resistor 12 as well as transistor 16. When the current reaches the design limit, the potential at input 28 exactly matches that at input 34 of comparator 22. The potential from these sources acts to charge capacitor 30 to this value. Although theoretically it is possible for the circuit to stay in an exactly matched input condition, noise and other variations will cause the amplifier to switch at this point or any greater current flow point whereby the output of comparator 22 is raised to a high potential. This potential will be somewhere near that of terminal 20. This turns off transistors 40 and 16. As will be realized, while the circuit is in operation there is current flow through resistor 59 which acts to limit the base current through transistor 16. The developed voltage across resistor 59 charges capacitor 54 to slightly less than the voltage across resistor 59. With transistors 16 and 40 in an OFF condition, the capacitor 54 can now discharge through resistor 48 and the base-emitter junction of transistor 44. The discharging of capacitor 54 turns transistor 44 to an ON condition thereby discharging capacitor 30 and keeping the potential of input 28 of amplifier 22 in a condition wherein transistor 16 and 40 stay in the OFF condition. At some point after capacitor 54 is discharged, transistor 44 turns OFF. However, capacitor 30 requires a small charging time to return the voltage of input 28 to a value which is more positive than that of input 34 of compartor 22. When capacitor 30 is charged, input 28 is again more positive than input 34 and the comparator changes output potentials toward that of input 24 and turns transistors 16 and 40 to an ON condition.

In one embodiment of the inventive concept, the capacitor 54 was 10 microfarads while capacitor 30 was 0.18 microfarads. Thus, the OFF time is primarily determined by capacitor 54. The capacitor 30 recharges very fast after transistor 44 is turned OFF and again allows the output of comparator 22 to turn transistors 16 and 40 ON. The ON or DELAY time in the overload mode is a function of capacitor 30 in combination with the value of resistor 26 and the offset voltage to comparator 22. Higher values of capacitance or resistance or offset voltage increases the ON time. It will be realized, however, that high overloads shorten the ON time. This last mentioned feature enhances the effectiveness of the circuitry.

As will be realized, if the load 56 is shorted and capacitor 30 is charged to a value such that comparator 22 is turned ON, it will take a finite amount of time to discharge again through resistor 26 to allow interruption of current.

It should be noted that the type of load dictates the minimum ON time. If large capacitors are present at the load, the ON time must be long enough to charge the capacitors. The ON-OFF time ratio (duty cycle) can be arbitrarily set by the values of the components used in the two timing circuits. A one percent duty cycle appears to be a good ratio for many applications. For inductive and resistive loads, the ON time must be long enough to charge capacitor 54, which in one embodiment was about 50 microseconds. If the current is designed to trip at a value such as 3 amps into the overload mode, the peak current is not necessarily limited to 3 amps. The peak current is a function of the current gain values of transistors 16 and 40. Thus, the base current limiting resistor 59 determined the maximum current.

Although the preferred embodiment uses the capacitor 30 as illustrated, the circuit will work equally as well if capacitor 30 is eliminated and the dash line capacitor 62 is inserted. The operation is still substantially identical as far as discharging by transistor 44 and recharging through resistor 26.

If the power supply providing current to terminal 10 is sensitive to step loads, the dash line components designated as 64 – 72 may be added to assure soft turn ON and turn OFF of the unit. Basically, this additional circuitry increases the time necessary to change from an ON to an OFF condition and vice versa.

While I have illustrated a preferred embodiment of the invention using specific types of transistors and comparators along with component values used in a preferred embodiment, I wish it to be realized that the concept can be practiced in various forms and thus I wish to be limited only by the scope of the appended claims.

What is claimed is:

1. Current limiting apparatus comprising, in combination:
    input terminal means for connection to input a direct voltage power source;
    output terminal means for connection to a load;
    current trip means, connected to said input terminal means, load supplied currents providing a voltage drop across said current trip means;
    voltage sensitive switch means, connected in series between said current trip means and said output terminal means, for normally maintaining a current path between said input and output terminal means when the voltage drop across said current trip means is less than a predetermined value and for interrupting said current path when the voltage drop across said current trip means exceeds said predetermined value;
    time delay means, connected to said switch means, for preventing immediate return of said switch means to a "normal" condition of providing a current path to said output terminal means; and
    resistor and capacitor means connected in series between said input terminal means and said output terminal means in parallel with the series connection of said trip means and said switch means for increasing the time necessary to complete interruption of current to said output terminal means.

2. Apparatus for minimizing power dissipation in series circuit current limiting means comprising, in combination:
    means for detecting current flow magnitude to a load;
    means, connected to said means for detecting, for interrupting current flow to the load upon detection of a current flow magnitude greater than a predetermined amount;
    means, connected to said detecting and interrupting means for maintaining the interrupted condition for a relatively long time compared to the current flow connected time during short circuited load conditions; and means, connected to said means for interrupting current flow, for lengthening the time necessary to change between the interrupted and connected current flow conditions.

3. current limiting apparatus comprising, in combination:
input terminal means for receiving current from a power source;
output terminal means for supplying current to a load;
resistance means for providing a voltage drop proportional to current flow therethrough;
solid state switch means including control means;
means connecting said resistance means and said solid state switch means in series between said input terminal means and said output terminal means;
reference means for providing a reference potential;
voltage comparator means, connected between said control means of said solid state switch means, said resistance means and said reference means, for interrupting current flow through said solid state switch means when the voltage drop across said resistance means exceeds a value determned by said reference means; and
time delay means, connected to said solid state switch means and to said voltage comparator means, for receiving a charging voltage during conditions of current flow to the load and for supplying a supplementary signal to said comparator means to maintain a condition of interrupted current flow for a predetermined time after the interruption commences.

4. Current limiting circuit apparatus for providing intermittent current flow when the current exceeds a predetermined limit comprising, in combination:
input terminal means for receiving current from a power source;
output terminal means for supplying current to a load;
resistance means for providing a voltage drop proportional to current flow therethrough;
solid state switch means including control means;
means connecting said resistance means and said solid state switch means in series between said input terminal means and said output terminal means;
current limit detection means, including first capacitive means for momentarily delaying changes in operation of said apparatus due to changes in condition, connected between said control means of said solid state switch means and said resistance means for interrupting current flow through said solid state switch means momentarily after the voltage drop across said resistance means exceeds a predetermined value; and
OFF time means, including second capacitive means, connected to said solid state switch means and to said current limit detection means, for receiving a charging voltage during conditions of current flow to the load and for supplying a supplementary signal to said detection means to discharge said first capacitive means and to maintain a condition of interrupted current flow for a predetermined time after the interruption commences.

* * * * *